United States Patent
Bosko et al.

(10) Patent No.: US 9,317,882 B2
(45) Date of Patent: Apr. 19, 2016

(54) SMART ORDER MANAGEMENT

(71) Applicant: International Business Machines Corporation, Armonk, NY (US)

(72) Inventors: Christopher M. Bosko, Durham, NC (US); Bryan D. Osenbach, Cary, NC (US); Jeffrey B. Sloyer, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/312,795

(22) Filed: Jun. 24, 2014

(65) Prior Publication Data

US 2015/0371317 A1 Dec. 24, 2015

(51) Int. Cl.
*G06Q 30/06* (2012.01)
*H04W 4/00* (2009.01)
*G06Q 50/12* (2012.01)
*G06K 5/00* (2006.01)

(52) U.S. Cl.
CPC ............ *G06Q 30/0635* (2013.01); *G06Q 50/12* (2013.01); *H04W 4/005* (2013.01)

(58) Field of Classification Search
CPC ............ G06Q 50/12; G06Q 10/06312; G06Q 30/0284; A47G 23/10; A47G 23/12
See application file for complete search history.

(56) References Cited

U.S. PATENT DOCUMENTS

| | | | |
|---|---|---|---|
| 7,418,413 B1 | 8/2008 | Benson | |
| 7,581,442 B1 * | 9/2009 | Dietz et al. | 73/293 |
| 2002/0178024 A1 * | 11/2002 | Terakoshi | 705/1 |
| 2003/0163287 A1 * | 8/2003 | Vock et al. | 702/187 |
| 2004/0158494 A1 * | 8/2004 | Suthar | 705/15 |
| 2005/0099304 A1 * | 5/2005 | Humphrey | 340/572.8 |
| 2006/0087831 A1 * | 4/2006 | Kramer | 362/101 |
| 2007/0250355 A1 * | 10/2007 | Leet et al. | 705/5 |
| 2008/0162290 A1 * | 7/2008 | Leifer | 705/15 |
| 2008/0276461 A1 * | 11/2008 | Gold | A47G 21/02 30/142 |
| 2010/0240962 A1 * | 9/2010 | Contant | 600/300 |
| 2013/0090959 A1 * | 4/2013 | Kvamme et al. | 705/5 |
| 2013/0157232 A1 * | 6/2013 | Ehrenkranz | 434/127 |
| 2013/0203024 A1 * | 8/2013 | Dekar | 434/127 |
| 2013/0325526 A1 * | 12/2013 | Tyler | 705/5 |
| 2013/0332208 A1 * | 12/2013 | Mehta | 705/5 |
| 2014/0018636 A1 * | 1/2014 | Contant et al. | 600/301 |
| 2014/0244324 A1 * | 8/2014 | Ford et al. | 705/5 |
| 2014/0349257 A1 * | 11/2014 | Connor | 434/127 |

FOREIGN PATENT DOCUMENTS

| | | |
|---|---|---|
| JP | 2008077643 | 4/2008 |
| WO | WO03067487 A1 | 8/2003 |

* cited by examiner

*Primary Examiner* — Thien M Le
*Assistant Examiner* — Claude J Brown
(74) *Attorney, Agent, or Firm* — VanLeeuwen & VanLeeuwen; Damion C. Josephs

(57) ABSTRACT

An approach is provided for smart order management. Smart utensils measure consumption of a meal by a customer. The smart utensils include at least one processor to perform the measuring and a transmitter that transmits data corresponding to the measured consumption. The smart utensils transmit the measurement to a restaurant data collection device. The approach predicts, based on the measuring, a completion time of the meal by the customer and notifies restaurant staff members of the predicted completion time.

17 Claims, 9 Drawing Sheets

US 9,317,882 B2

SMART ORDER MANAGEMENT

BACKGROUND OF THE INVENTION

In restaurants there is often time wasted between courses and at the end of a meal. Between courses, food may be prepared and in the kitchen waiting for a member of the wait staff to deliver it to the customer. The food might get cold and the overall quality of the food might become worse over time. In addition, customers finished with their meal often wait an inordinate amount of time for the bill. This is caused by bad time management by servers and chefs. This causes wasted food and unhappy customers. In addition, these inefficiencies reduce the overall number of customers that the restaurant can serve, resulting in less revenue and profits for the restaurant and its owner.

SUMMARY

An approach is provided for smart order management. Smart utensils measure consumption of a meal by a customer. The smart utensils include at least one processor to perform the measuring and a transmitter that transmits data corresponding to the measured consumption. The smart utensils transmit the measurement to a restaurant data collection device. The approach predicts, based on the measuring, a completion time of the meal by the customer and notifies restaurant staff members of the predicted completion time.

In one embodiment, the smart utensils are assigned to a number of customers seated at a table. In this embodiment, the progress of each customer is measured based on the menu items ordered by each customer. In a further embodiment where multiple courses are ordered, the approach predicts when customers will complete a first course and notifies restaurant staff so that the second course is completed in a timely manner. In another further embodiment, the approach detects when a refillable item, such as a beverage, is nearing completion and notifies a member of the wait staff to inquire as to whether the customer would like a refill of the refillable item. In yet another further embodiment, the approach detects when a customer is not consuming a delivered menu item and notifies restaurant staff so that the staff can discuss any satisfaction issues with the menu item and rectify the situation. A customer's satisfaction may further be detected by using a customer profile of the customer's eating habits so that the non-consumption detection is made in conjunction with the customer's eating habits.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
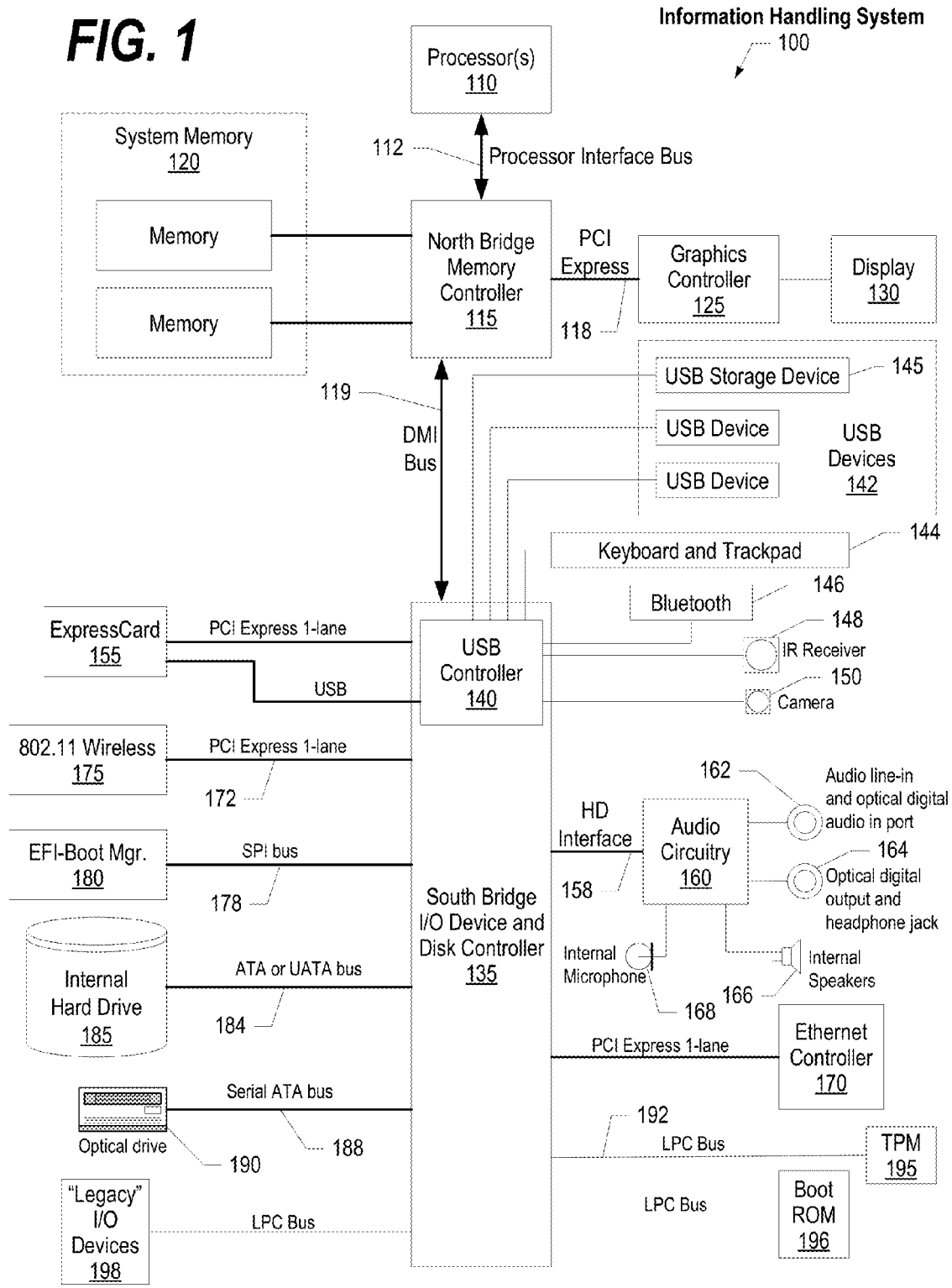
FIG. 1 depicts a block diagram of a processor and components of an information handling system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 2:
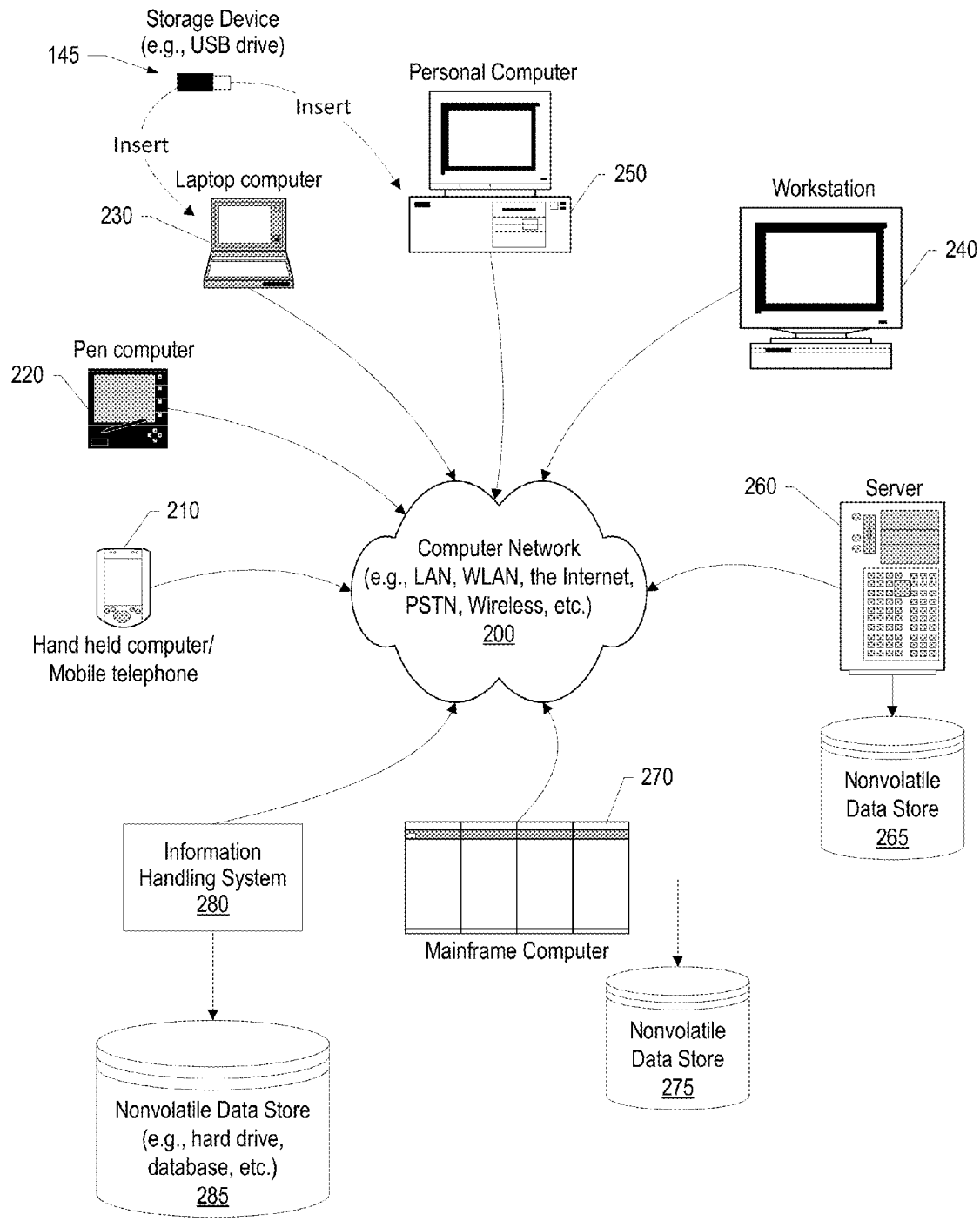
FIG. 2 is a network environment that includes various types of information handling systems interconnected via a computer network.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195 via low pin count (LPC) bus 192. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE .802.11 standards of over-the-air modulation techniques that all use the same protocol to wirelessly communicate between information handling system 100 and another computer system or device. EFI-Boot manager 180 connects to Southbridge 135 using serial peripheral interface (SPI) bus 178. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3-8 depict an approach that can be executed on an information handling system, to perform the smart order management described herein. This approach predicts provides a system and method for utensils to determine when a customer is finished eating food out of a bowl/plate and communicate consumption status with a data collection device, such as a device deployed at the table. The table then communicates with the kitchen to notify the chef that a customer is done with a particular course. The approach includes multiple components including smart eating utensils, communication of eating utensils to the table, and communication of the table to kitchen.

The smart utensil determine whether a customer has finished the food in their dish. In one embodiment, the fork/spoon will measure and record the eating rate. The eating rate is defined as the number of pick up and set downs the fork/spoon has and the number of interactions with a bowl/plate. Once the interactions stop for a certain amount of time, the utensils deem that the course is finished. The course could also be determined as finished if the bowl/plate is empty as well. The eating utensils are in communication with the restaurant's data collection device. Smart utensils send the above metrics on a periodic basis. The communication could be implemented over a variety of protocols such as WiFi, bluetooth, NFC, or RFID.

The approach provides a method for determining how quickly or slowly a guest is consuming their food. This is determined by the rate of the person interacting with their plate/bowl with the fork/spoon. Also, this is combined with how much food is left on the plate. Additionally the spoon or fork can measure the amount of food in it each time it is picked up. This would be combined with the original weight of the dish that the smart plate/bowl would provide. These different metrics are combined to determine how quickly a guest is consuming their food. Once the table receives data from the utensils that a particular course is finished, the table communicates with the kitchen to notify the restaurant staff.

The table is connected to a central system via either Wi-Fi or Ethernet. The table signals the central system that a course has finished for a customer at a table. This signal triggers an event on the central system to send an event to the kitchen that notifies the food preparation staff that course has been finished. There will be cases where one customer at a table finishes before another. The system accounts for this. The central system identifies the prep and cooking times for upcoming courses and notifies the staff appropriately as to when to prepare courses so all courses arrive at the same time for the entire table. The approach also provides a way of calculating when course is complete and the projected time when the course will be completed. This allows the restaurant staff to correctly start the next course at the right time.

Additionally the restaurant can build a profile to learn of customer's eating habits so the approach can learn over time to better predict when a guest will done with a course. Furthermore, the approach provides a way of determining if a guest is unhappy with their meal. The approach can detect when a guest slows down eating and does not eat a particular menu item. This might indicate that the guest is not satisfied with a particular menu item. The system can then notify the wait staff to provide pre-emptive action to contact the guest to try to rectify the situation. The approach can also detect when a refillable item, such as a beverage, is complete or almost complete and notify the wait staff so that the wait staff can inquire whether a refill is desired by the customer.

Figure 3:
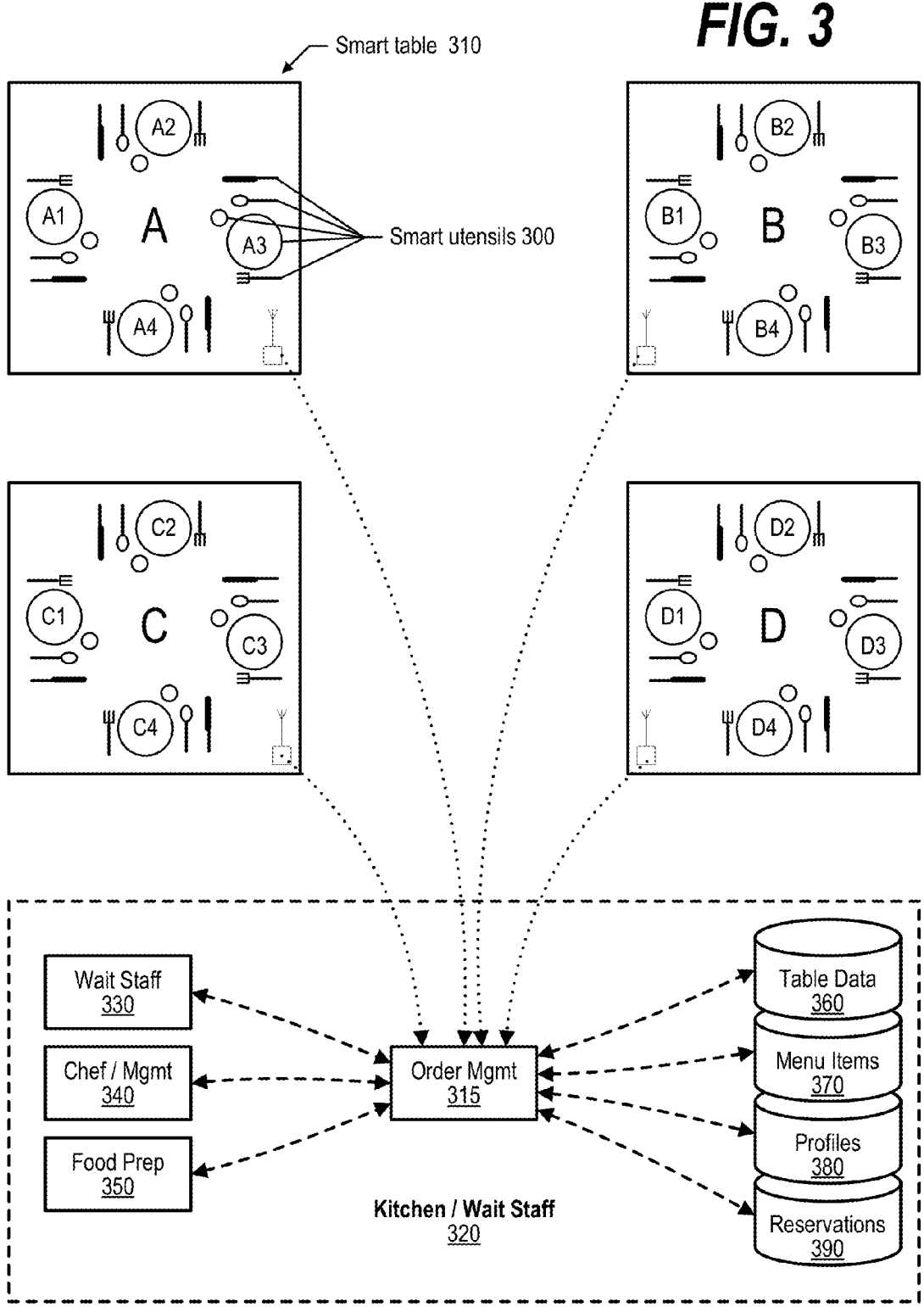
FIG. 3 is a component diagram depicting the various components in smart order management including smart utensils, tables, and the kitchen/wait staff.
Figure 9:
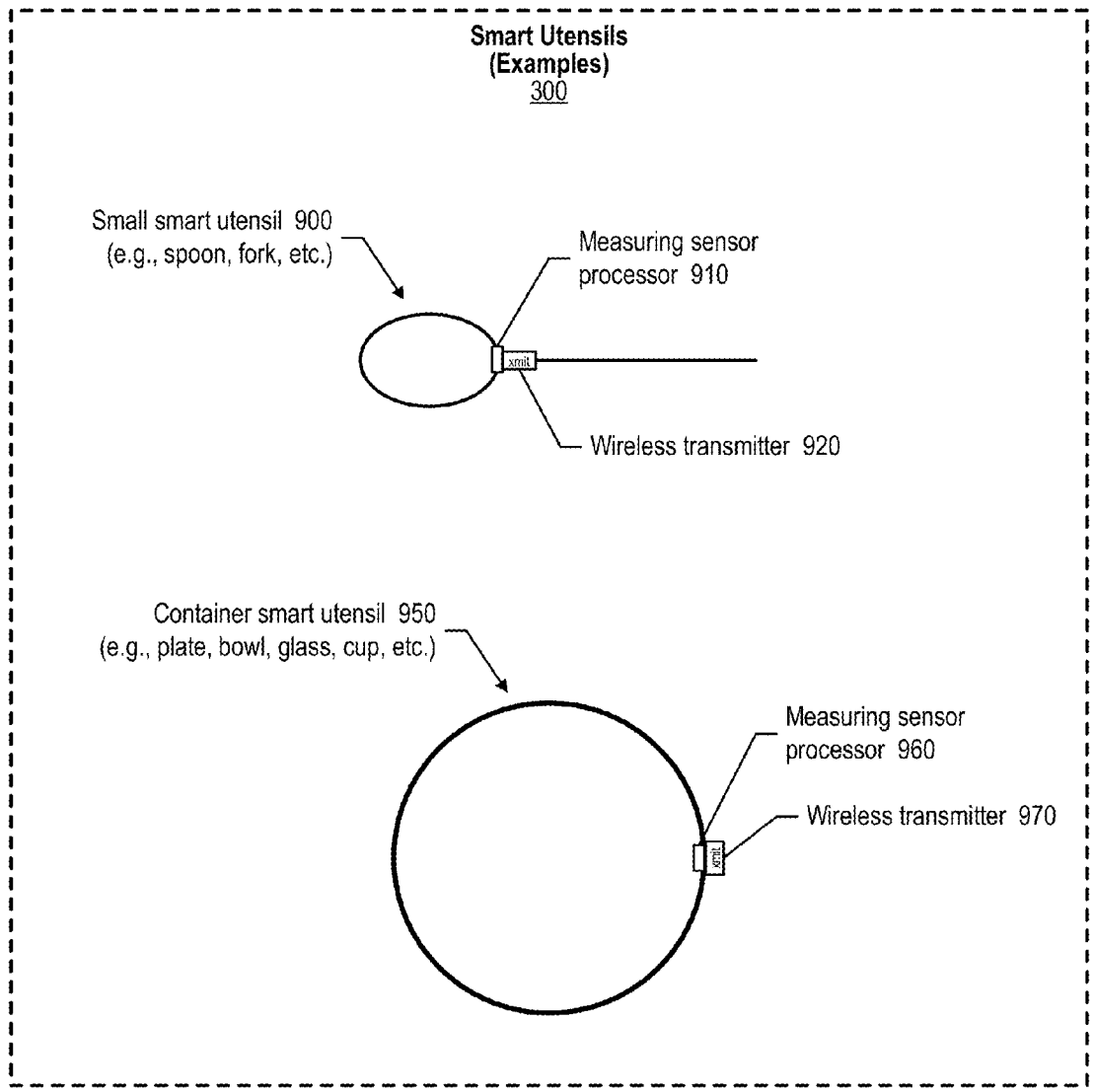
FIG. 9 is a depiction of an example of a small smart utensil and a container smart utensil.

FIG. 3 is a component diagram depicting the various components in smart order management including smart utensils, tables, and the kitchen/wait staff. Four tables are shown (tables A, B, C, and D). Each of the tables is similar to smart table A (310) that is shown with sets of smart utensils for each of the four customers that will be seated at table A. In one embodiment, smaller smart utensils such as forks and spoons measure and record the eating rate of menu items served to the customers. The eating rate is the number of pick up and set downs of the small smart utensils and the number of interactions with a bowl/plate. Once the interactions stop for a certain amount of time, the utensils deem that the course is finished. Container smart utensils, such as plates, bowls, glasses, and the like, measure the amount of food (menu item) in or on the container smart utensils and determine that the customer is finished based on weight or volume of the food. In one embodiment, an initial measurement (weight, volume, etc.) is taken and compared with subsequent measurements to determine a predicted completion time of the menu item by the customer and the rate of consumption by the customer. Small smart utensils 300, such as a spoon or fork, can measure the number of times the utensil is raised and lowered while the customer is consuming food to determine the amount consumed and predict a completion time for the menu item, a course, or a complete meal. In addition, small smart utensils can have sensors included that measure the amount (volume, weight, etc.) of each bite of food consumed to better measure the consumption of the meal by the customer. Container smart utensils, such as bowls, plates, glasses, cups, and mugs, have sensors included that measure the volume or weight of food. The weight of the empty container smart utensils is subtracted from the weight of the container smart utensils as the customer is eating to measure the consumption of the food by the customer. Examples of both a spoon smart utensil and a container smart utensil are shown in FIG. 9.

Smart utensils include transmitters that transmit the measurements taken at the smart utensils to one or more restaurant data collection devices. In one embodiment, each table includes a data collection device that is a receiver and transmitter. The table collection device receives measurements transmitted from the smart utensils and, in turn, transmit table-based consumption data to a more centralized restaurant data collection device, such as data collection device 315. In one embodiment, the smart utensils transmit measurement data directly to centralized restaurant data collection device 315.

The restaurant's order management system notifies restaurant staff regarding a customer's anticipated completion of a course or meal as well as other events that may be detected using the smart utensils. These other events may include detecting that a customer is not consuming a delivered menu item and the smart order management system can notify appropriate restaurant staff to rectify the situation. Restaurant staff may encompass kitchen/wait staff 320, which includes wait staff 330, chef or management 340, and food preparation staff 350.

Various data stores are maintained to facilitate the smart order management system. These data stores include table data store 360 that stores details of the smart utensils being used by each customer at a table, the items ordered by each customer at the table, and an optional customer identifier or name of one or more of the customers at the table. The customer identifier is associated with a customer profile that is stored in data store 380. In one embodiment, the customer profiles can be used to detect any eating habits pertaining to a particular customer. Other data stores that are used by the smart order management system include menu items data store 370 that detail menu items available at the restaurant. The menu item details may also include an approximate weight or volume of the menu item as well as estimated preparation time so that, if the menu item is part of a subsequent course, the food preparation staff can be notified at the appropriate time to start preparing the item so that it is prepared when the customer is ready for the next course. In addition, reservations data store 390 is used by the smart order management system to estimate when a party with a reservation can be seated based on the predicted meal completion times for customers currently occupying the restaurant's tables.

Figure 4:
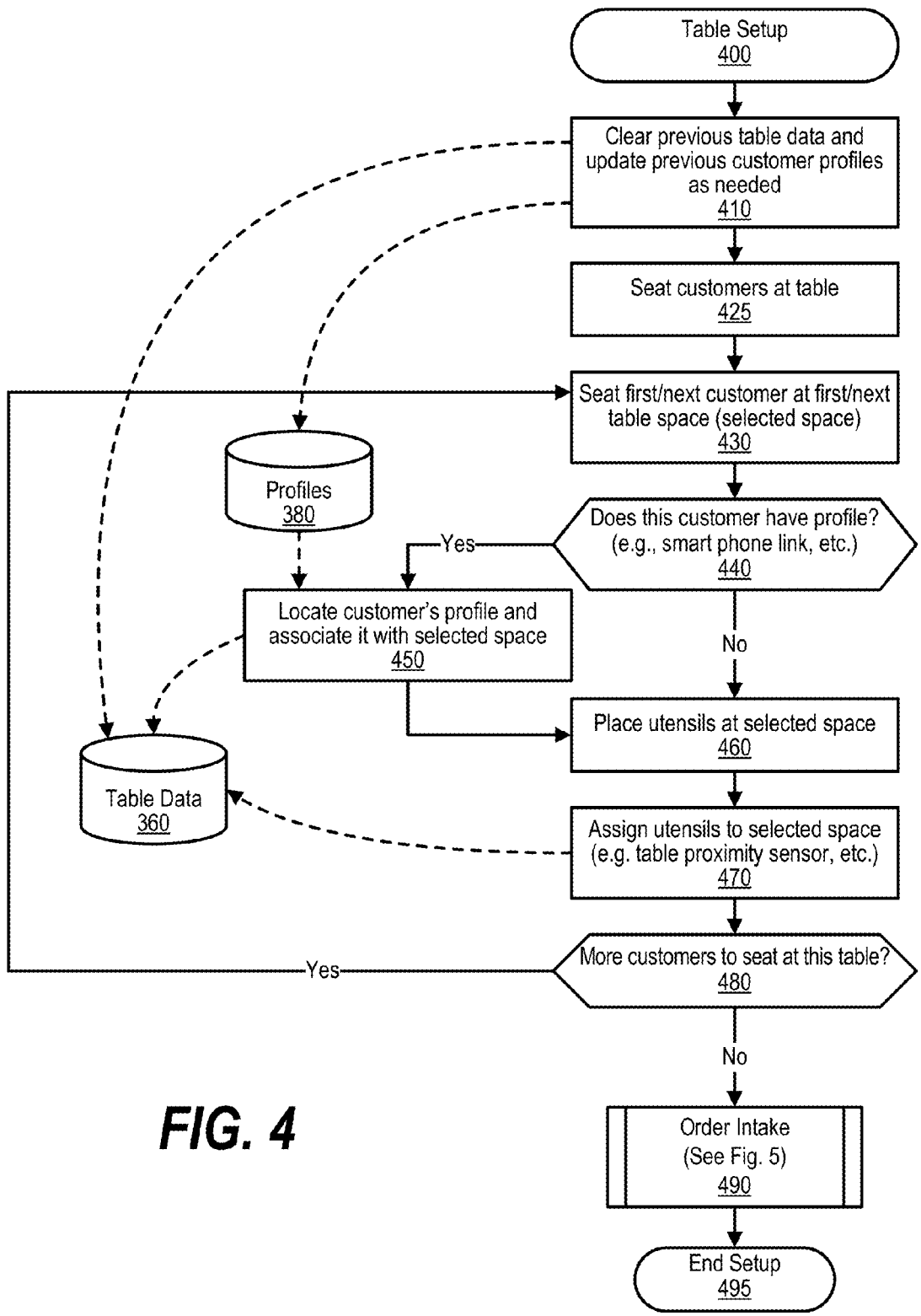
FIG. 4 is a depiction of a flowchart showing the logic performed during the table setup process of smart order management.

FIG. 4 is a depiction of a flowchart showing the logic performed during the table setup process of smart order management. Processing commences at 400 whereupon, at step 410 the process clears any previous table data pertaining to customers that were previously seated at the selected table. This table data, such as customer names, items ordered, and the like, is cleared from data store 360. If a customer profile is being created for any of the previous customers or if any of the previous customers have established customer profiles, then the customer profiles are also updated at step 410. In one embodiment, customer profile data is used to identify any particular eating habits that pertain to any of the restaurant's customers.

At step 425, the newly arrived customers are seated at the (now empty) table. At step 430, the first customer is seated at the first (selected) table space. The process determines as to whether this customer has a customer profile at the restaurant (decision 440). In one embodiment, the customer's profile can be retrieved using a link on the customer's smart phone. If the customer does have a profile, then decision 440 branches to the "yes" branch whereupon, at step 450, the process locates the customer's profile from data store 380 and associates the customer's retrieved profile with the selected space at the table where the customer has been seated. The association between the selected table space and the customer's profile is stored in table data store 360 for future reference. On the other hand, if the customer does not have a profile (or if customer profiles are not used by the restaurant), then decision 440 branches to the "no" branch bypassing step 450.

At step 460, a member of the wait staff places smart utensils at the selected space and, at step 470, the smart utensils placed at the selected space are assigned to the customer at the selected space. The assignment of the smart utensils to the customer is recorded in table data store 360. The process determines as to whether there are additional customers to seat at the table (decision 480). If there are more customers to seat, then decision 480 branches to the "yes" branch which loops back to seat the next customer at the next selected space, associate any customer profile with the next customer, and assign smart utensils to the next customer as described above. This looping continues until all of the customers have been seated, at which point decision 480 branches to the "no" branch.

Figure 5:
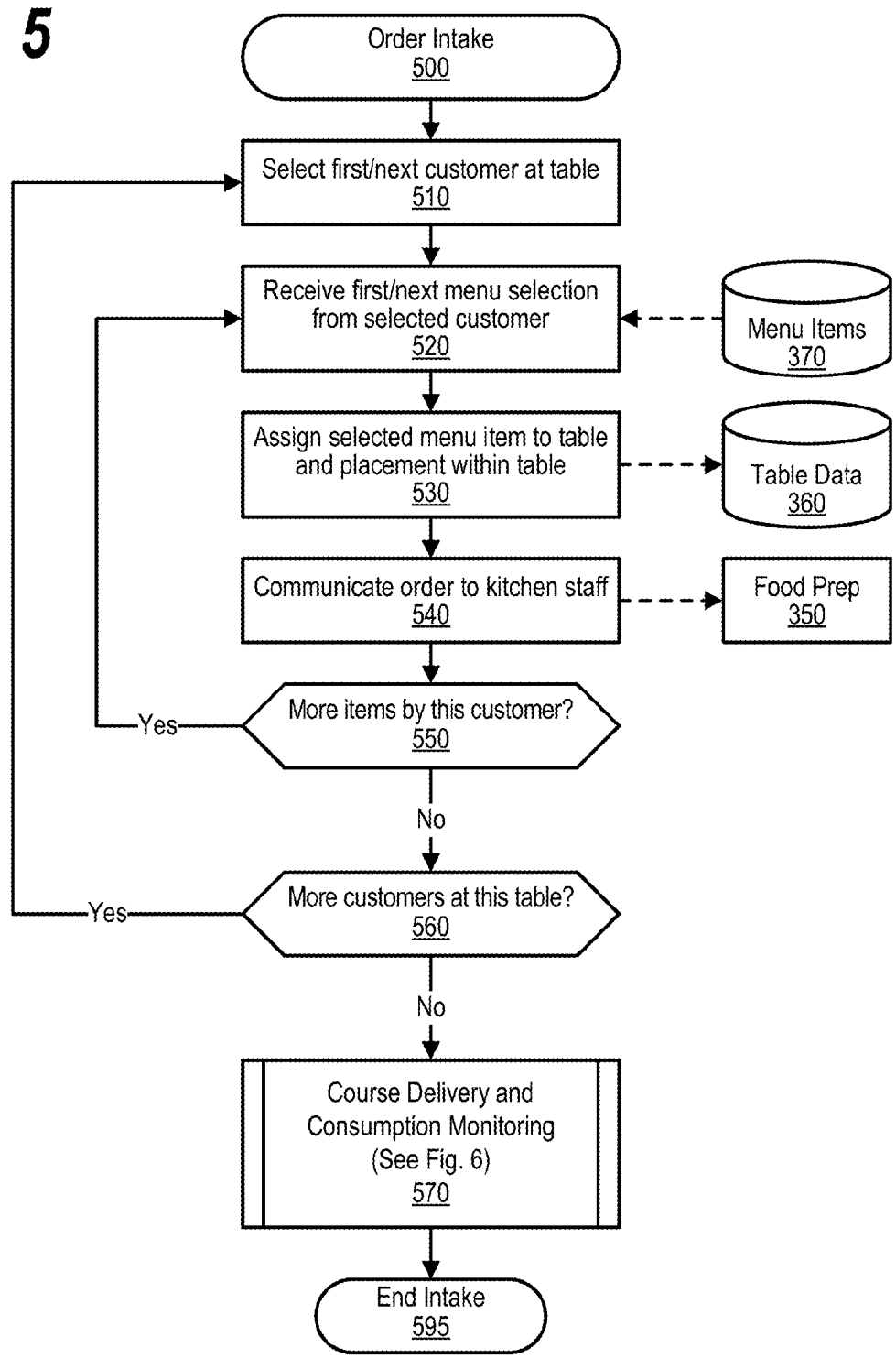
FIG. 5 is a depiction of a flowchart showing the logic performed during the order intake process of smart order management.

At predefined process 490, the order intake process is performed (see FIG. 5 and corresponding text for further processing details). After the order has been taken, setup processing ends at 495.

FIG. 5 is a depiction of a flowchart showing the logic performed during the order intake process of smart order management. Processing commences at 500 whereupon, at step 510 the process, using a member of the wait staff, selects the first customer seated at the table. At step 520, the first menu selection is received from the selected customer. Menu items and details regarding menu items are retrieved from data store 370). At step 530, the process assigns the selected menu item to the table and the placement (customer) within the table. The assignment of the menu item to the table and the customer is recorded in table data store 360. At step 540, the menu item that was ordered is communicated to food preparation staff 350. In this manner, the food preparation staff can commence preparing the item before the entire order intake process has completed. In addition, if the item ordered is currently not available, the wait staff member can be promptly notified so that a different menu item can be ordered by the customer. The process determines as to whether the selected customer wishes to order additional menu items (decision 550). If the customer wishes to order additional menu items, then decision 550 branches to the "yes" branch which loops back to receive the next menu item from the customer as described above. This looping continues until all of the items desired by the selected customer have been ordered, at which point decision 550 branches to the "no" branch.

The process determines as to whether there are additional customers seated at the table that have not yet ordered (decision 560). If there are more customers that need to order, then decision 560 branches to the "yes" branch which loops back to select the next customer at the table and receive the menu items desired by the next customer as described above. This looping continues until all of the customers seated at the table have ordered, at which point decision 560 branches to the "no" branch whereupon, at predefined process 570, the course delivery and consumption monitoring process is performed (see FIG. 6 and corresponding text for further processing details). Order intake processing thereafter ends at 595.

Figure 6:
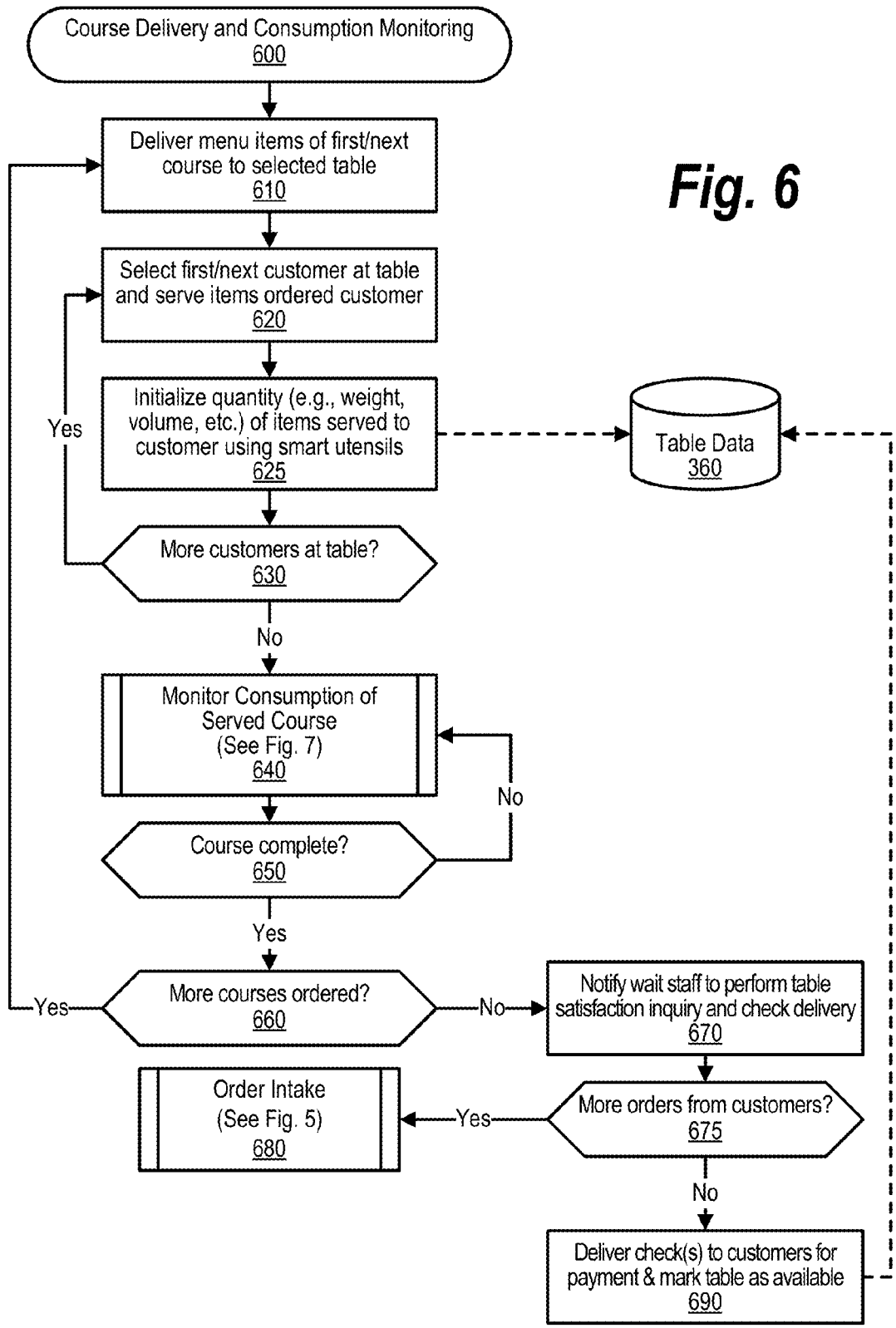
FIG. 6 is a depiction of a flowchart showing the logic performed during the course delivery and consumption monitoring process of smart order management.

FIG. 6 is a depiction of a flowchart showing the logic performed during the course delivery and consumption monitoring process of smart order management. Processing commences at 600 whereupon, at step 610 the process, by way of a member of the restaurant's wait staff, delivers menu items of the first course to the selected table. At step 620, the process (member of the wait staff) selects the first customer seated at the table and serves the items ordered by the selected customer to the customer. At step 625, the process initializes the quantity (e.g., the weight, volume, etc.) of the menu items served to the customer. In one embodiment, the initialized quantity is performed using by measurement taken by the smart utensils assigned to the selected customers. The initial quantities are stored in table data store 360. The process determines as to whether there are more customers seated at the table (decision 630). If there are more customers seated at the table, then decision 630 branches to the "yes" branch which loops back to select the next customer and serve the next customer the menu items that were ordered by the customer as described above. This looping continues until all of the customers at the table have been served with their respective menu items, at which point decision 630 branches to the "no" branch.

Figure 7:
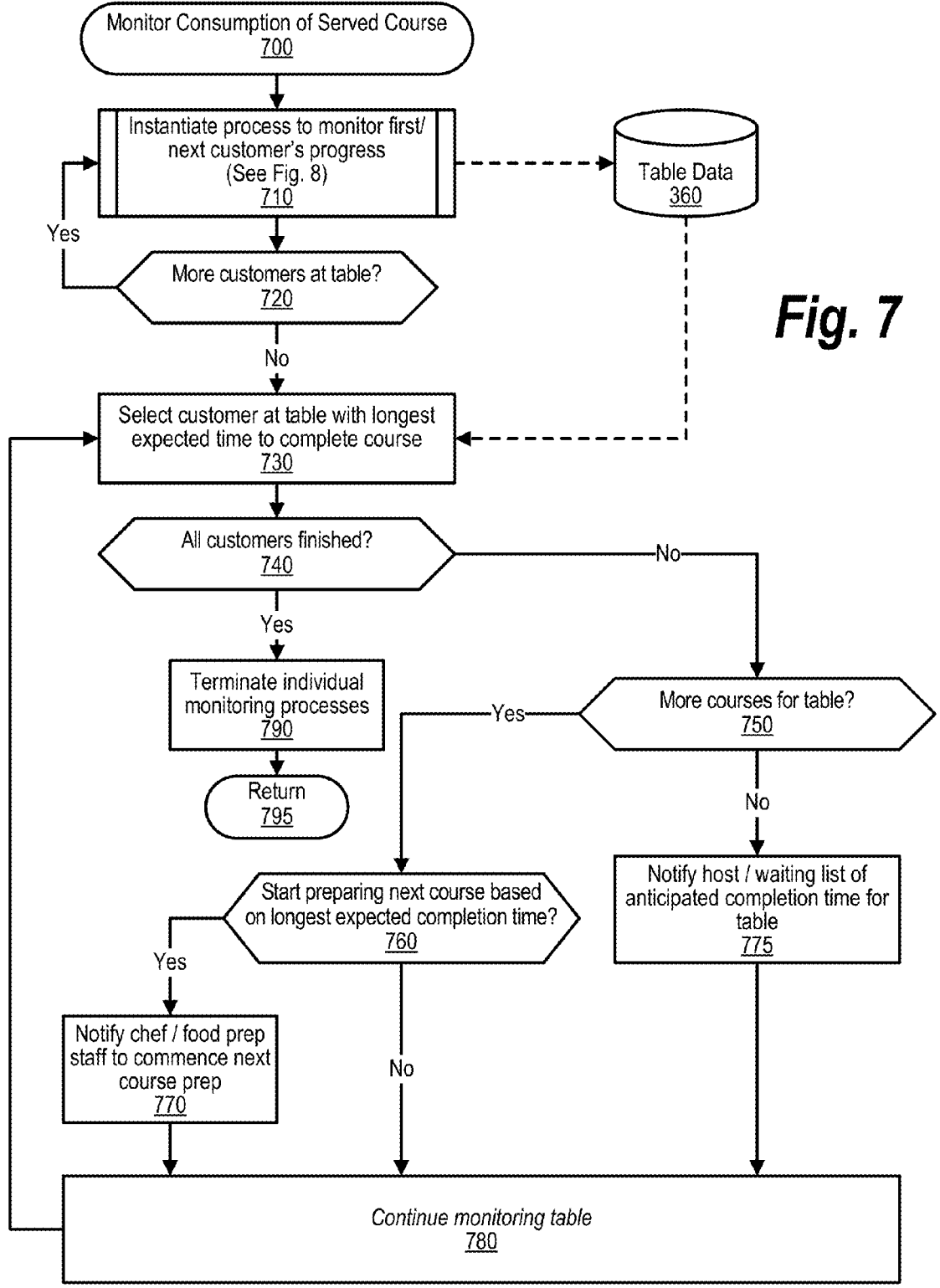
FIG. 7 is a depiction of a flowchart showing the logic performed during the consumption monitoring of a served course process of smart order management.

At predefined process 640, the smart order management monitors the consumption of the served course of food by the customers at the table (see FIG. 7 and corresponding text for further processing details). The process repeatedly determines whether the current course has been completed by the customers (decision 650). The process continues to take the "no" branch and loop back to predefined process 640 until the course is completed by everyone at the table, at which point decision 650 branches to the "yes" branch.

The process determines as to whether more courses of food have been ordered by the customers at the table (decision 660). If more courses were ordered, then decision 660 branches to the "yes" branch which loops back to deliver the next course of food as described above. This looping continues until all courses of food ordered by the customers at the table have been delivered and consumed, at which point decision 660 branches to the "no" branch for final processing.

At step 670, the process notifies a member of the wait staff to perform a meal satisfaction inquiry at the table and deliver the check to the customers at the table for payment. The process determines as to whether one or more customers at the table wish to order more items rather than check out (decision 675). If customers wish to order more menu items, then decision 675 branches to the "yes" branch whereupon predefined process 680 performs the order intake process once again (see FIG. 5 and corresponding text for further processing details). On the other hand, if the customers do not wish to order additional menu items, then decision 675 branches to the "no" branch whereupon, at step 690, a member of the wait staff delivers the final checks to the customers at the table and, after table cleanup, the table is marked as being available in table data store 360.

FIG. 7 is a depiction of a flowchart showing the logic performed during the consumption monitoring of a served course process of smart order management. Processing commences at 700 whereupon, at predefined process 710 a process is instantiated to monitor the consumption of food by the first customer at the table (see FIG. 8 and corresponding text for further processing details). Predefined process 710 updates table data store 360 regarding the measurement by the customer's smart utensils of the meal by the customer. The process determines as to whether there are more customers seated at the table (decision 720). If there are more customers seated at the table, then decision 720 branches to the "yes" branch which loops back to instantiate a process to monitor the consumption of food by the next customer. This looping continues until a process has been instantiated to monitor the consumption of food by every customer that is seated at the table, at which pint decision 720 branches to the "no" branch for further processing.

At step 730, the process selects the customer seated at the table with the longest expected time to complete the current course of food. The selection is made from the table data that is retrieved from data store 360. The process determines as to whether all of the customers at the table have finished the current course (decision 740). If one or more customers have not yet finished the current course, then decision 740 branches to the "no" branch whereupon the process determines as to whether there are more courses that have been ordered by the customers at the table (decision 750).

If there are more courses that have been ordered by the customers at the table, then decision 750 branches to the "yes" branch whereupon the process determines whether it is time to commence preparation of the next course of menu items based on the longest expected completion time for a customer at the table (decision 760). If, based on the predicted completion time, it is time to start preparing the next course, then decision 760 branches to the "yes" branch whereupon, at step 770, the process notifies the chef or a member of the food preparation staff to commence preparation of the next course. On the other hand, if it is not yet time to start preparing the next course, then decision 760 branches to the "no" branch bypassing step 770. Returning to decision 750, if there are no more courses that have been ordered by customers at the table, then decision 750 branches to the "no" branch whereupon, at step 775, the process notifies the wait staff of the predicted completion time of the meal by the customers seated at the table. The wait staff can then use this information to inform customers with reservations or waiting for a table regarding the approximate wait time.

At step 780, the process continues monitoring the consumption of the meal by the customers at the table with processing repeatedly looping back to step 730. This looping continues until all of the customers seated at the table are actually finished with the meal, at which point decision 740 branches to the "yes" branch whereupon, at step 790, the process terminates each of the individual customer consumption monitoring processes instantiated at predefined process 710 and processing returns to the calling routine (see FIG. 6) at 795.

Figure 8:
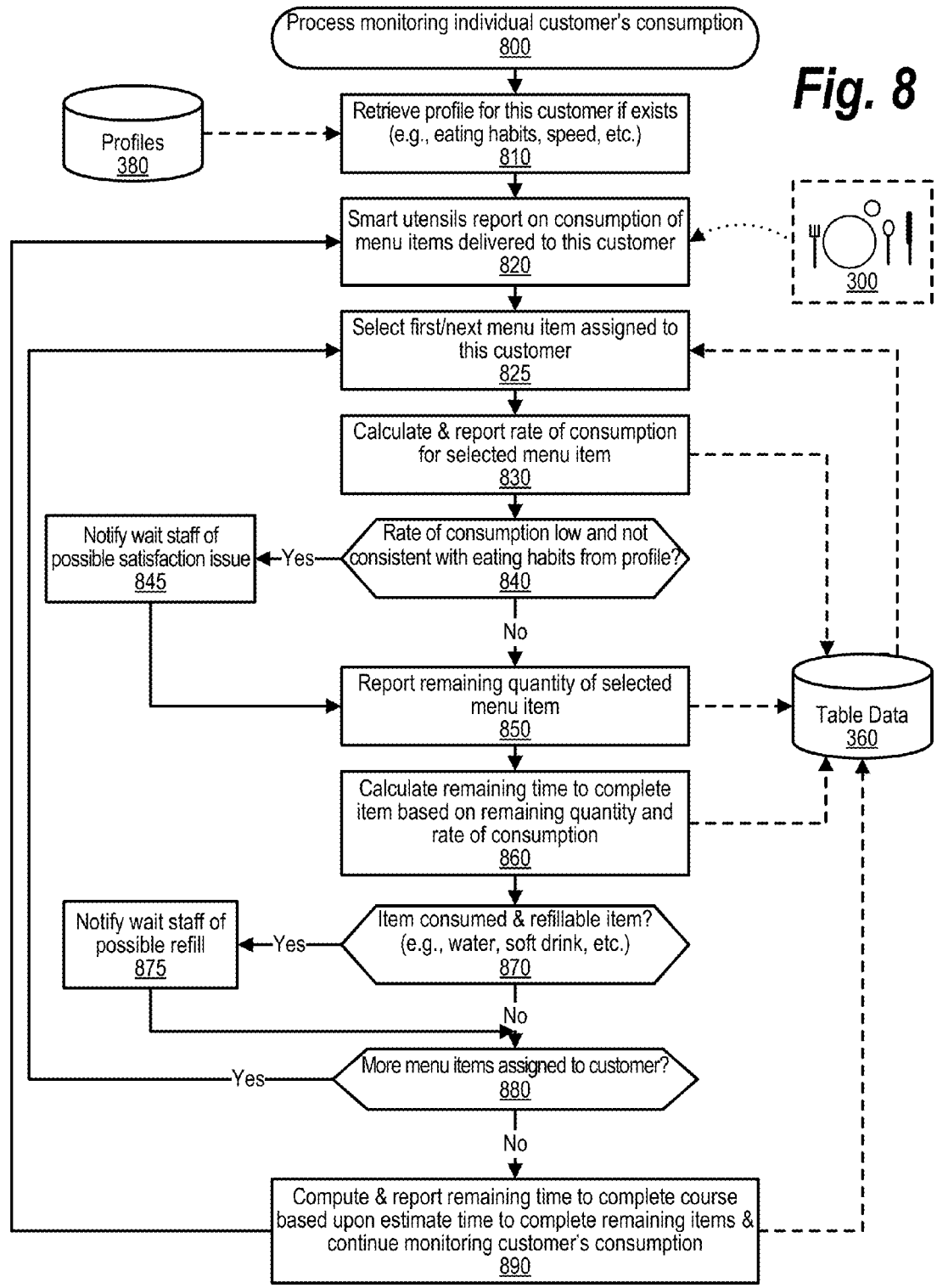
FIG. 8 is a depiction of a flowchart showing the logic performed during the individual processes that monitor each customer's consumption of the meal in the smart order management process.

FIG. 8 is a depiction of a flowchart showing the logic performed during the individual processes that monitor each customer's consumption of the meal in the smart order management process. Processing commences at 800 whereupon, at step 810 the process retrieves the customer profile for this customer if a profile exists. The profile is retrieved from data store 380 and includes customer eating habits, the customer's normal speed of eating, etc. At step 820, the smart utensils (300) assigned to this customer report on the measured consumption of the meal (menu items) that have been delivered to the customer by wirelessly transmitting the consumption data to a restaurant data collection device.

At step 825, the process selects the first menu item assigned to the customer that has been delivered to the customer for consumption. At step 830, the process calculates and reports the customer's rate of consumption for the selected menu item using the consumption measurement data reported for the customer's smart utensils. The rate of consumption of the menu item is stored in table data store 360. The process determines as to whether the customer's rate of consumption of the selected menu item is low (decision 840). In one embodiment, the determination also takes into account whether the low rate of consumption is inconsistent with the customer's eating habits included in the customer's profile. If the rate of consumption of the selected menu item is low, then decision 840 branches to the "yes" branch whereupon, at step 845, a member of the wait staff or management is notified regarding a possible satisfaction issue regarding the menu item and the customer. In this manner, restaurant staff can proactively address and rectify any satisfaction issues before receiving a complaint from the customer. On the other hand, if the rate of consumption is not low or is not otherwise inconsistent with the customer's eating habits, then decision 840 branches to the "no" branch bypassing step 845.

At step 850, the process reports on the remaining quantity of the selected menu item that remains to be consumed by the customer. The remaining quantity value is stored in table data store 360. At step 860, the process calculates the remaining time to complete the menu item based on the remaining quantity and the customer's rate of consumption of the menu item. The estimated remaining time to complete is also stored in table data store 360.

The process determines as to whether the menu item has been completely, or nearly completely, consumed by the customer and the menu item is a refillable menu item, such as a beverage (decision 870). If the menu item is refillable and has been consumed, or nearly consumed, by the customer, then decision 870 branches to the "yes" branch whereupon, at step 875, the process notifies a member of the wait staff regarding a possible refill. In this manner, the wait staff can proactively deliver or inquire about a refill before the customer asks for a refill. On the other hand, if the menu item is not a refillable item or, if a refillable item, the item is not yet consumed or nearly consumed, then decision 870 branches to the "no" branch bypassing step 875.

The process determines as to whether there are more menu items that have been assigned to the customer (decision 880). If there are more menu items that have been assigned to the customer, then decision 880 branches to the "yes" branch which loops back to step 825 to select and process the next menu item as described above. This looping continues until each of the menu items assigned to the customer have been processed, at which point decision 880 branches to the "no" branch. At step 890, the process computes and reports the remaining time predicted for this customer to complete the current course based upon a predicted time to complete the remaining items. The process loops back to step 820 to continue monitoring customer's consumption of menu items. Monitoring of the customer's consumption continues until the customer has completed the meal.

FIG. 9 is a depiction of an example of a small smart utensil and a container smart utensil. Smart utensils 300 include both small smart utensils and container smart utensils. An example of a small smart utensil is smart spoon 900. Smart spoon 900 includes processor 910 that includes a sensor. In one embodiment, processor 910 measures the number of times the smart utensil is used by the customer with the number of uses being extrapolated to determine the rate of consumption of the meal and the customer's consumption of the meal (or a menu item included in the meal). Processor 910 transmits measurement data to a restaurant data collection device using wireless transmitter 920. In another embodiment, processor 910 includes a weight and/or volume sensor that senses the amount of food being consumed each time the utensil is used by the consumer.

Container smart utensil 950 is a utensil used to hold, or contain, food while it is being consumed by the customer. Examples of container smart utensils include plates, bowls, mugs, glasses, cups, and the like. Similar to small smart utensil 900, container smart utensil 950 also includes a processor (processor 960) and a wireless transmitter (wireless transmitter 970). Processor 960 utilized by container smart utensil 950 includes a weight and/or volume sensor that measures the weight and/or volume of food in or on the container.

Processor 960 transmits collected measurement data to a restaurant data collection device using wireless transmitter 970.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

1) A Method for communicating to a restaurant server a user progress with a meal comprising: using a smart utensil to measure user progress with a meal; logging user progress with a local system (table computer); and communicating the user progress to the restaurant server so that wait staff can predict a completion time of the meal. 2) As in 1, wherein the smart utensil calculates a rate of consumption of the meal. 3) As in 1, wherein the smart utensil measures a proportion of the meal consumed (may see visually be embedded optical device). 4) As in 1, wherein the smart utensil measures a trend of consumption of the meal (the current rate of consumption versus a historical rate, i.e. the user slowing down). 5) As in 1, wherein a plurality of smart utensils each for a respective meals and an aggregate users progress is calculated and communicated to the restaurant server. 6) As in 1, further comprising detecting one of the group consisting of a smart utensil position, a smart utensil lack of movement for a predetermined period of time or a gesture with a smart utensil; responsive to the detecting, communicating to the restaurant server that the user has finished the meal. 7) As in 1, wherein a camera, microphone or weight scale is used to measure user progress with a meal, rather than or in addition to the smart utensil.

What is claimed is:

1. A method of smart order management in a restaurant, the method comprising:
    measuring a consumption of a meal by a customer, wherein the meal includes one or more menu items, and wherein the measuring is performed by one or more smart utensils being used by the customer to consume the meal, and wherein the smart utensils include at least one processor to perform the measuring and a transmitter that transmits data corresponding to the measured consumption;
    detecting, based on the measuring performed by at least one of the one or more smart utensils, a lack of consumption of at least one of the one or more menu items; and
    communicating the detected lack of consumption to one or more staff members of the restaurant.

2. The method of claim 1 wherein the customer is one of a plurality of customers seated at a table, and wherein the method further comprises:
    assigning a set of one or more of the smart utensils to each of the customers;
    receiving a meal order from each of the customers, wherein each of the meal orders includes one or more of the menu items;
    initializing an item quantity corresponding to an item size of each of the one or more menu items;
    delivering the ordered meals to each of the customers; and
    measuring the consumption of the one or more menu items included in the ordered meals by the plurality of customers, wherein the measuring is performed using the assigned smart utensils.

3. The method of claim 2 wherein the ordered meals include a plurality of courses with a first course of menu items being delivered before a second course of menu items, and wherein the method further comprises:
    delivering the first course of menu items to each of the customers;
    predicting, based on the measuring, a completion time of the first course by the each of the customers;
    communicating the predicted first course completion time to one or more of the staff members of the restaurant; and
    preparing the second course of menu items in a manner so that the second course of menu items can be delivered to the customers at the predicted first course completion time.

4. The method of claim 2 wherein at least one of the menu items ordered by one or more of the customers is a refillable menu item, wherein the method further comprises:
    predicting a consumption completion time of the refillable menu item; and
    communicating the refillable menu item consumption completion time to a selected staff member of the restaurant so that the selected staff member can inquire with the customers regarding an order for refills.

5. The method of claim 2 further comprising:
    calculating a rate of consumption corresponding to each of the menu items being consumed by each of the plurality of customers;
    transmitting the rates of consumption to a restaurant data collection device, wherein the restaurant data collection device is selected from the group consisting of a selected one of the smart utensils, a table-based data collection device, and a restaurant-based data collection device;
    calculating a remaining time to complete value corresponding to each of the menu items being consumed by each of the plurality of customers;
    predicting a table completion time based on an analysis of the plurality of remaining time to complete values; and
    communicating the predicted table completion time to one or more staff members of the restaurant.

6. The method of claim 1 further comprising:
    prior to the detecting, retrieving a profile corresponding to the customer, wherein the profile includes one or more eating habits of the customer; and
    comparing the customer's one or more eating habits with the detected lack of consumption, wherein the communicating is performed in response to the detected lack of consumption deviating from the customer's eating habits.

7. An information handling system comprising:
    one or more processors;
    a memory coupled to at least one of the processors;

a wireless network adapter that wirelessly connects the information handling system to a plurality of smart utensils; and a set of instructions stored in the memory and executed by at least one of the processors to perform smart order management, wherein the set of instructions perform actions of:

measuring a consumption of a meal by a customer, wherein the meal includes one or more menu items, and wherein the measuring is performed by one or more smart utensils being used by the customer to consume the meal, and wherein the smart utensils include at least one processor to perform the measuring and a transmitter that transmits data corresponding to the measured consumption;

detecting, based on the measuring performed by at least one of the one or more smart utensils, a lack of consumption of at least one of the one or more menu items; and communicating the detected lack of consumption to one or more staff members of the restaurant.

8. The information handing system of claim 7 wherein the customer is one of a plurality of customers seated at a table, and wherein the steps further comprise:

assigning a set of one or more of the smart utensils to each of the customers;

receiving a meal order from each of the customers, wherein each of the meal orders includes one or more of the menu items;

initializing an item quantity corresponding to an item size of each of the one or more menu items;

delivering the ordered meals to each of the customers; and measuring the consumption of the one or more menu items included in the ordered meals by the plurality of customers, wherein the measuring is performed using the assigned smart utensils.

9. The information handing system of claim 8 wherein the ordered meals include a plurality of courses with a first course of menu items being delivered before a second course of menu items, and wherein the steps further comprise:

delivering the first course of menu items to each of the customers;

predicting, based on the measuring, a completion time of the first course by the each of the customers;

communicating the predicted first course completion time to one or more of the staff members of the restaurant; and preparing the second course of menu items in a manner so that the second course of menu items can be delivered to the customers at the predicted first course completion time.

10. The information handing system of claim 8 wherein at least one of the menu items ordered by one or more of the customers is a refillable menu item, wherein the steps further comprise:

predicting a consumption completion time of the refillable menu item; and communicating the refillable menu item consumption completion time to a selected staff member of the restaurant so that the selected staff member can inquire with the customers regarding an order for refills.

11. The information handing system of claim 8 wherein the steps further comprise:

calculating a rate of consumption corresponding to each of the menu items being consumed by each of the plurality of customers;

transmitting the rates of consumption to a restaurant data collection device, wherein the restaurant data collection device is selected from the group consisting of a selected one of the smart utensils, a table-based data collection device, and a restaurant-based data collection device;

calculating a remaining time to complete value corresponding to each of the menu items being consumed by each of the plurality of customers;

predicting a table completion time based on an analysis of the plurality of remaining time to complete values; and communicating the predicted table completion time to one or more staff members of the restaurant.

12. The information handing system of claim 7 wherein the steps further comprise:

prior to the detecting, retrieving a profile corresponding to the customer, wherein the profile includes one or more eating habits of the customer; and comparing the customer's one or more eating habits with the detected lack of consumption, wherein the communicating is performed in response to the detected lack of consumption deviating from the customer's eating habits.

13. A computer program product stored in a computer readable storage medium, comprising computer instructions that, when executed by an information handling system, causes the information handling system to perform smart order management by performing actions comprising:

measuring a consumption of a meal by a customer, wherein the meal includes one or more menu items, and wherein the measuring is performed by one or more smart utensils being used by the customer to consume the meal, and wherein the smart utensils include at least one processor to perform the measuring and a transmitter that transmits data corresponding to the measured consumption;

detecting, based on the measuring performed by at least one of the one or more smart utensils, a lack of consumption of at least one of the one or more menu items; and communicating the detected lack of consumption to one or more staff members of the restaurant.

14. The computer program product of claim 13 wherein the customer is one of a plurality of customers seated at a table, and wherein the steps further comprise:

assigning a set of one or more of the smart utensils to each of the customers;

receiving a meal order from each of the customers, wherein each of the meal orders includes one or more of the menu items;

initializing an item quantity corresponding to an item size of each of the one or more menu items;

delivering the ordered meals to each of the customers; and measuring the consumption of the one or more menu items included in the ordered meals by the plurality of customers, wherein the measuring is performed using the assigned smart utensils.

15. The computer program product of claim 14 wherein the ordered meals include a plurality of courses with a first course of menu items being delivered before a second course of menu items, and wherein the steps further comprise:

delivering the first course of menu items to each of the customers;

predicting, based on the measuring, a completion time of the first course by the each of the customers;

communicating the predicted first course completion time to one or more of the staff members of the restaurant; and preparing the second course of menu items in a manner so that the second course of menu items can be delivered to the customers at the predicted first course completion time.

16. The computer program product of claim 14 wherein at least one of the menu items ordered by one or more of the customers is a refillable menu item, wherein the steps further comprise:
  predicting a consumption completion time of the refillable menu item; and
  communicating the refillable menu item consumption completion time to a selected staff member of the restaurant so that the selected staff member can inquire with the customers regarding an order for refills.

17. The computer program product of claim 13 wherein the steps further comprise:
  prior to the detecting, retrieving a profile corresponding to the customer, wherein the profile includes one or more eating habits of the customer; and
  comparing the customer's one or more eating habits with the detected lack of consumption, wherein the communicating is performed in response to the detected lack of consumption deviating from the customer's eating habits.

* * * * *